United States Patent
Lail et al.

[11] Patent Number: 5,930,431
[45] Date of Patent: Jul. 27, 1999

[54] FIBER OPTIC CABLE

[75] Inventors: Jason C. Lail, Hickory; Charles D. Marion, Taylorsville; Michael G. Rawlyk, Hickory, all of N.C.

[73] Assignee: Siecor Operations, LLC, Hickory, N.C.

[21] Appl. No.: 09/001,679

[22] Filed: Dec. 31, 1997

[51] Int. Cl.$^6$ .................................................. G02B 6/44
[52] U.S. Cl. ................................................... 385/100
[58] Field of Search .................................. 385/100, 102, 385/106, 107, 109

[56] References Cited

U.S. PATENT DOCUMENTS

| | | | |
|---|---|---|---|
| 2,797,731 | 4/1957 | Carlson, Jr. ......................... | 154/41 |
| 3,087,007 | 4/1963 | Jachimowicz ....................... | 174/110 |
| 3,881,052 | 4/1975 | Britz et al. .......................... | 174/103 |
| 3,943,271 | 3/1976 | Bahder et al. ....................... | 174/23 R |
| 4,075,419 | 2/1978 | Virkus ................................. | 174/107 |
| 4,079,190 | 3/1978 | Jones et al. ......................... | 174/102 |
| 4,221,926 | 9/1980 | Schneider ........................... | 174/107 |
| 4,322,574 | 3/1982 | Bow et al. ........................... | 174/107 |
| 4,360,395 | 11/1982 | Suzuki ................................. | 156/54 |
| 4,377,908 | 3/1983 | Pan ...................................... | 29/828 |
| 4,439,632 | 3/1984 | Aloisio, Jr. et al. ................. | 174/106 |
| 4,477,298 | 10/1984 | Bohannon et al. .................. | 156/54 |
| 4,482,413 | 11/1984 | Bohannon et al. .................. | 156/54 |
| 4,504,112 | 3/1985 | Gould et al. ........................ | 350/96.23 |
| 4,510,346 | 4/1985 | Brush, Jr. et al. .................. | 174/36 |
| 4,557,560 | 12/1985 | Bohannon et al. .................. | 350/96.23 |
| 4,569,704 | 2/1986 | Bohannon et al. .................. | 156/48 |
| 4,729,629 | 3/1988 | Saito et al. ......................... | 350/96.23 |
| 4,830,689 | 5/1989 | Ramsey et al. ..................... | 156/54 |
| 4,878,733 | 11/1989 | Winter et al. ....................... | 350/96.23 |
| 4,963,695 | 10/1990 | Marciano-Agostinelli et al. ..... | 174/23 |
| 5,013,127 | 5/1991 | Bernard ............................... | 350/96.23 |
| 5,043,538 | 8/1991 | Hughey, Jr. et al. ................ | 174/107 |
| 5,043,539 | 8/1991 | Connole et al. ..................... | 174/107 |
| 5,188,883 | 2/1993 | Rawlyk ............................... | 428/189 |
| 5,350,617 | 9/1994 | Fujisawa et al. .................... | 428/141 |
| 5,388,175 | 2/1995 | Clarke ................................. | 385/100 |
| 5,427,643 | 6/1995 | Aitken et al. ....................... | 156/304.5 |
| 5,451,718 | 9/1995 | Dixon .................................. | 174/102 |
| 5,684,904 | 11/1997 | Bringuier et al. ................... | 385/109 |
| B1 4,802,732 | 5/1990 | Fukuma ............................... | 350/96.23 |

*Primary Examiner*—Rodney Bovernick
*Assistant Examiner*—Robert E. Wise

[57] ABSTRACT

A fiber optic cable (10) includes a cable core (20) and a jacket section (30). Cable core (20) includes a central member (21), buffer tubes (23, 26), and optical fibers (22, 25) in respective buffer tubes. Jacket section (30) includes a tape layer (34) with a seam (35), and a seam guard (40) disposed over seam (35). Seam guard (40) is operative to perform dual functions, as the seam guard includes substrate (42) operative to prevent cable zippering, and a waterblocker (44) operative to inhibit the migration of moisture into cable core (20). FIGS. 1–3.

22 Claims, 2 Drawing Sheets

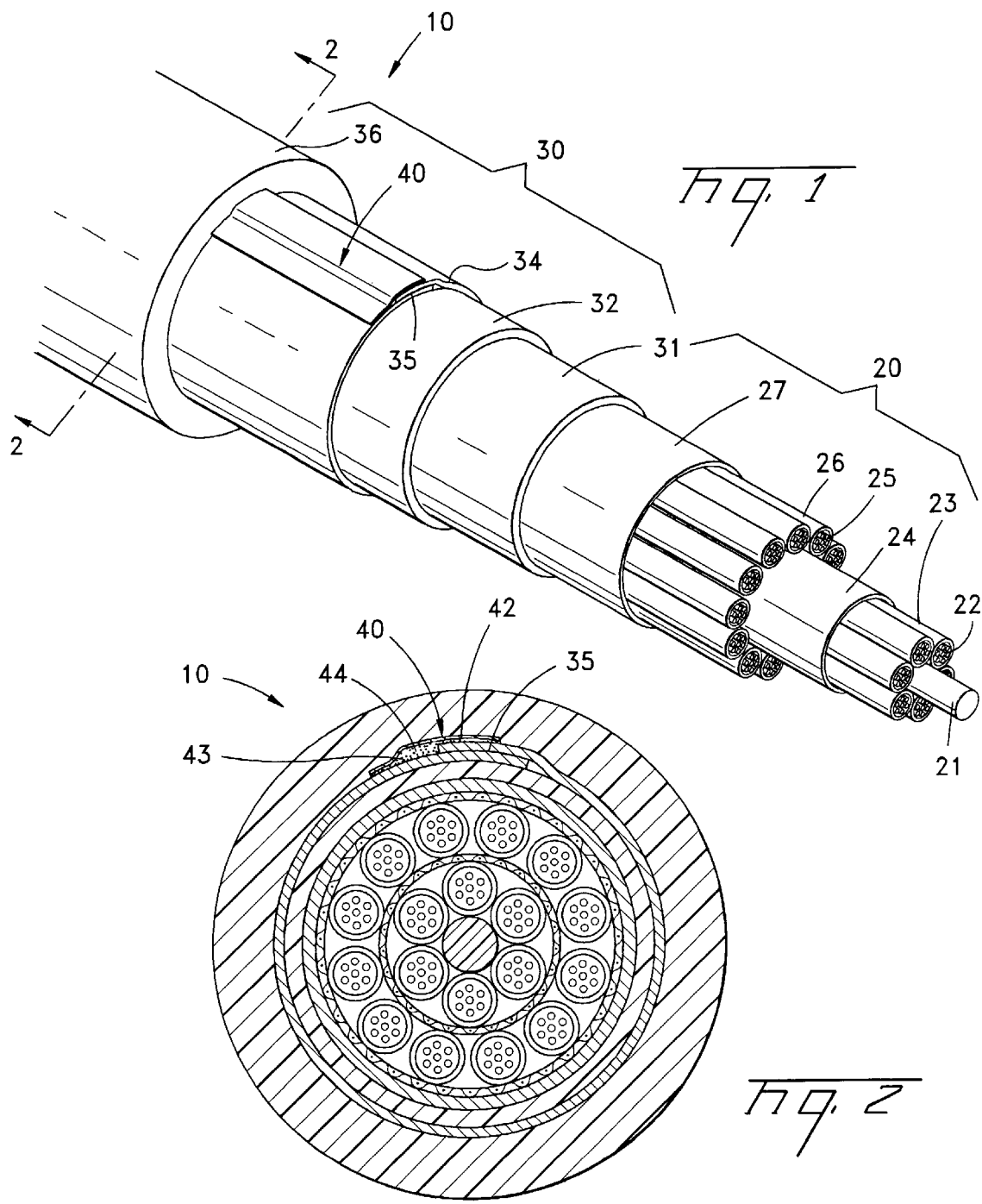

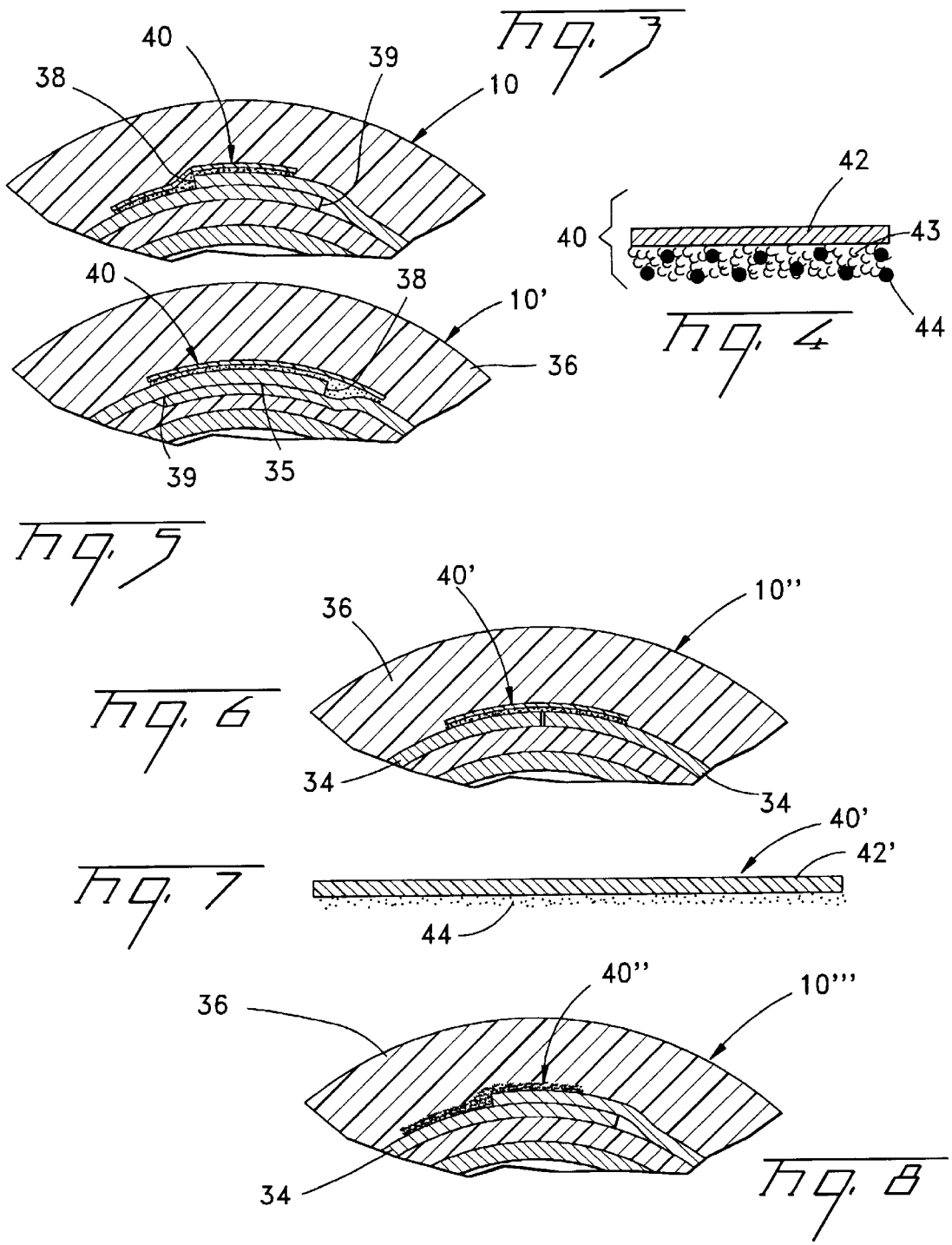

FIBER OPTIC CABLE

The present invention relates to the field of fiber optic cables, and, more particularly, to fiber optic cables which include a layer of tape.

Fiber optic cables are used to transmit telephone, television, and computer data information in indoor and outdoor environments. Outside plant fiber optic cables are designed for use in the outdoor environment, and should be robust enough to withstand cable bending and twisting action, and attack by rodents. Additionally, an outside plant fiber optic cable should contain a component which inhibits the ingress of moisture into the cable core. Tapes are conventionally used in fiber optic cable designs for armoring protection against rodent attack, for electrical shielding, and/or to prevent the ingress of moisture into the cable core. Such tapes, which may be metallic, e.g. steel, or nonmetallic, e.g. plastic, typically include a seam where edges of the tape touch or remain in close proximity with respect to each other. The seam may be, for example, an edge-to-edge configuration or an overlap configuration formed by longitudinally overlapping edges of the tape.

A fiber optic cable having a layer of tape may be required to pass a cable twist test and a water-blocking test, for example, as established by BELLCORE test standards. The cable twist test, which simulates the kind of bending and twisting the cable is expected to undergo during use, may be used to determine a cable's ability to resist jacket zippering. During the cable manufacturing process, a plastic material is extruded over the tape thereby forming a cable jacket. However, because of the tendency of the portions of the tape adjacent the seam to spring away from each other, or to be otherwise mis-aligned, the seam is quite often a step-like, uneven joint. During the cable manufacturing process, the plastic material extruded over the seam generally conforms to the uneven shape of the seam. During installation, use, or testing of the cable, where the cable is subjected to bending and/or twisting action, stress concentrations may develop in the uneven portion of the jacket, which may cause the jacket to split or "zipper". Zippering may be more likely to occur where the jacket is coupled to the edges of the tape and, where the tape is of the metallic type, a hazard may exist in that a sharp edge of the tape may cut the jacket material thereby causing the jacket to zipper. Zippering breaches the mechanical integrity of the cable and, although it is generally associated with metallic tapes, zippering may nevertheless result from the use of a nonmetallic tape as well. An example of a non-metallic tape used as an alternative to metallic armoring is a commercially available Heat Expandable Tape.

Additionally, as noted above, outside plant fiber optic cables may be required to pass a water-blocking test. A typical water-blocking test involves subjecting an end of a fiber optic cable to a head of water and evaluating the distance the water penetrates into the cable. Outside plant fiber optic cables typically experience the potential for the ingress of moisture where the cable is cut and/or by diffusion through the cable jacket. A fiber optic cable without adequate water-blocking capability is subject to damage of the optical fibers therein, and to the undesirable state of becoming a duct for the flow of water.

In light of the foregoing fiber optic cable test requirements, the following cable designs form a part of the background of the present invention. A known electrical cable which addresses the cable zippering problem is disclosed in U.S. Pat. No. 3,087,007 wherein an electrical cable with an overlap type seam formed of armor tape includes a bridging tape placed over the overlap seam. The primary function of the bridging tape is to serve as a mechanical bridge between the overlapping edges of the seam. Extrusion of a jacket over the bridging tape holds it in place over the overlap seam. The bridging tape is designed to prevent cutting of the jacket by an edge of the armor tape.

U.S. Pat. No. 3,943,271 disclosed sealing the overlap area in a power cable by application of a bridging tape disposed over an overlap type seam. The bridging tape is a polyester or a Mylar material. Interstices adjacent the tape are flooded with a sealant for preventing moisture from traversing the seam area. The sealant is an asphalt rubber or a polyester flooding compound. U.S. Pat. No. 4,221,926 discloses a fiber optic cable having a tape placed over an overlap type seam. The tape is a laminate of aluminum foil, Kraft paper, and Mylar. A conventional flooding compound is used to fill gaps in the cable and is designed to act as a heat shield for preventing immediate shrinkage of the tape during extrusion of the jacket material. The avoidance of tape shrinkage is indicated as reducing the likelihood of the formation of step-like configurations in the jacket. However, cables which include flooding compound at the overlap seam are difficult to manufacture, and, during a cable termination procedure, may require a time consuming flooding compound removal process. Moreover, the cables of the foregoing cable designs, made without flooding compound at the seam, are subject to the potential for the ingress of moisture into the cable core.

To prevent the ingress of moisture at the seam, cable designs which rely solely on adhesive bonds between edges of the tape have been proposed. U.S. Pat. No. 4,360,395 discloses an overlap type seam which is coated with an adhesive which fills the overlap area and is designed to provide mechanical strength and a moisture-tight seal. U.S. Pat. No. 4,439,632 discloses an overlap type seam formed of a metallic tape which is pre-coated with an ethylene acrylic acid adhesive material whereby the heat of extrusion of the jacket causes the overlapping edges to become bonded together. However, the use of adhesive bonding to prevent the ingress of moisture may be disadvantageous because such adhesive materials may be expensive, and may not, in larger cables, assure bonding between overlapping edges of the tape. Moreover, due to the fact that when the adhesive is used on an ordinary corrugated tape, the adhesive may not properly bond the edges of the tape together. Fiber optic cables which include an adhesively bonded overlap type seam and which experience at least the same disadvantages are disclosed in U.S. Pat. No. 4,477,298, U.S. Pat. No. 4,557,560, U.S. Pat. No. 4,569,704, U.S. Pat. No. 4,729,629, and U.S. Pat. No. 5,427,643. Moreover, cables made according to the foregoing cable designs do not include protection against jacket zippering, and therefore may not pass cable twist tests.

Non-adhesive based means to resist the ingress of moisture at the seam have been proposed. U.S. Pat. No. 5,451,718 discloses an expensive solution wherein an overlap seam includes sealant nested between folds formed in edges of an armor tape. U.S. Pat. No. 4,963,695 discloses an overlap seam with a flooding compound disposed between non-folded layers of an overlap seam, the flooding compound having a water swellable material applied to the surfaces thereof. Cables made according to the foregoing cable designs, however, do not include protection against jacket zippering, and therefore may not pass cable twist tests.

OBJECT(S) OF THE INVENTION

It is an object of the present invention to provide a low-cost fiber optic cable with a tape layer having a seam which is protected by a seam guard, the seam guard, preferably without the use of a flooding compound, is operative to prevent the ingress of moisture into the cable core, and to prevent jacket zippering.

BRIEF DESCRIPTION OF THE DRAWINGS

FIG. 1 is an isometric view of a fiber optic cable made according to the present invention.

FIG. 2 is a cross section of the fiber optic cable of FIG. 1 taken along line 2—2.

FIG. 3 is an enlarged sectional view of FIG. 2.

FIG. 4 is a cross section of a seam guard according to a first embodiment of the present invention.

FIG. 5 is a sectional view of a fiber optic cable according to a second embodiment of the present invention.

FIG. 6 is a sectional view of a fiber optic cable made according to a third embodiment of the present invention.

FIG. 7 is an enlarged view of the seam guard shown in FIG. 6.

FIG. 8 is a sectional view of a fiber optic cable made according to a fourth embodiment of the present invention.

DETAILED DESCRIPTION OF THE INVENTION

Referring to FIGS. 1–3, a fiber optic cable 10 according to a first embodiment of the present invention will be described. Fiber optic cable 10 includes a cable core 20 and a jacket section 30. In a preferred embodiment of the present invention, jacket section 30 includes a seam guard 40 which advantageously performs the dual functions of preventing zippering and inhibiting the ingress of moisture into the cable core.

Cable core 20 includes a dielectric central member 21 surrounded by a first set of buffer tubes 23. Buffer tubes 23 are, in turn, surrounded by a water-blocking tape 24, and each tube 23 includes respective optical fibers 22 therein. Optical fibers 22 are preferably embedded in a water-blocking material, for example, a conventional water-blocking gel or grease. Cable core 20 may include a second set of buffer tubes 26 with respective optical fibers 25 therein which are likewise preferably disposed in a water-blocking material. Buffer tubes 26 are surrounded by a water-blocking tape 27.

Jacketing section 30 includes a tape 31, preferably of a metallic type, which surrounds water-blocking tape 27. Tape 31 is surrounded by a plastic sheath 32 which, in turn, is surrounded by a tape 34. Tape 34 may be of a sheet or fabric type, and may be formed of a metallic material, e.g. steel, or a non-metallic material, e.g. plastic. In the preferred embodiment of the present invention, tape 34 is a metallic tape. Tape 34 preferably is mechanically robust enough to withstand attack by rodents and to bar the migration of moisture into the cable core. Tape 34 includes a seam 35 of the overlap type which is formed by a non-offset tape layer 38 and an offset tape layer 39. In a preferred embodiment, offset tape layer 39 is located radially outside of non-offset tape layer 38. A seam guard 40 according to the present invention is placed over seam 35 and rests, preferably without an adhesive, against portions of tape layers 38, 39. An outer jacket 36 formed of, for example, a polyethylene or a PVC material, surrounds both tape 34 and seam guard 40.

Seam guard 40, according to a first embodiment of the present invention as shown in FIG. 4, is a laminate comprising a substrate 42 preferably attached to a waterblocker 43. Waterblocker 43 preferably comprises a non-woven, porous substrate which is impregnated with a conventional water swellable, superabsorbent polymer (SAP) material 44, for example, materials comprising poly-sodium-acrylate homopolymers or copolymers. SAP 44 is a craft friendly, low-cost, dry water-blocking material which, by preferably avoiding the use of a flooding compound, enhances cable handling efficiency while meeting industry performance requirements. Substrate 42 preferably comprises a polymeric material, for example, a polyester or a MYLAR material. Substrate 42 is preferably a thin film of a preferred thickness of about 0.25 to 10 mils. Alternative materials which are robust enough for use as a substrate 42 in seam guard 40 comprise: a high strength paper; fiberglass; a high temperature foamed plastic, e.g. foamed polyethylene; foil; a polyimide film; or a high temperature vinyl material. The foregoing alternative materials have a suitable melt temperature, will not burn during extrusion, and are suitable for attachment to waterblocker 43.

During manufacture of the cable, a cross-head extruder with an extruder tip is used to extrude jacket 36 over tape 34 and seam guard 40. Prior to extrusion of the jacket, seam guard 40 is paid off a reel and is applied to seam 35. The preferred payoff allows for placement of seam guard 40 directly on seam 35 before seam guard 40 enters the back of the cross-head.

Seam guard 40, according to the present invention, comprises significant manufacturing/cost advantages over the use of flooding compounds. For example, rather than a potentially non-uniform deposition of a flooding compound on the seam by an applicator nozzle, higher line speeds are achievable with the present invention as seam guard 40 can be de-reeled at a high rate of speed and uniformly incorporated into the cable on seam 35. Moreover, the use of seam guard 40 according to the present invention is particularly advantageous over flooding compounds because, during manufacture, cable core 20 may rotate about its longitudinal axis up to about 90 degrees. Extrusion of jacket 36 couples seam guard 40 to cable 10 whereby the alignment of seam guard 40 with respect to seam 35 prior to extrusion of jacket 36 is precisely maintained as the cable core rotates. Seam guard 40 is thus locked into alignment with seam 35 and, as the cable core rotates, seam guard 40 follows. On the other hand, a flooding compound applicator nozzle would disadvantageously require an expensive control system to move the applicator nozzle in an attempt to place a bead of flooding compound on the rotating seam. Further, the use of seam guard 40 according to the present invention is advantageous in that it eliminates the need for the tooling required to apply flooding compound to a cable core.

During use of cable 10, seam guard 40 is operative to prevent zippering and to inhibit the ingress of moisture into the cable core. Substrate 42 prevents contact between and the adhesion of jacket 36 to tape 34 in the vicinity of seam 35. When fiber optic cable 10 is bent and/or twisted, the lack of adhesion between jacket 36 and tape 34 at seam 35 avoids stress concentrations in jacket 36 adjacent the seam thereby reducing the potential for zippering. Additionally, the use of a film thickness substrate, rather than a thick bridging tape, avoids a step-like distortion in the cable jacket. Additionally, where tape 34 is of the metallic type, the presence of seam guard 40 prevents an edge of the tape from slicing into jacket 36 during bending or twisting of the cable, thereby reducing the potential for zippering. Moreover, waterblocker 43 is operative to absorb any moisture which is present at seam 35 and to thereby inhibit the ingress of moisture into cable core 20.

FIG. 5 shows a section of a fiber optic cable 10' according to another embodiment of the present invention wherein seam 35 is formed by a reverse overlap, for example, offset tape layer 39 is located radially inside of non-offset tape layer 38. Seam guard 40 is placed over seam 35 without the need for a step-like bend formed therein. By forming an inwardly directed overlap seam, i.e. with offset edge 39 directed away from jacket 34, a cutting edge relative to jacket 36 is eliminated, and the formation of a step-like distortion in jacket 20 is avoided, which affords protection against jacket zippering.

FIG. 6 shows a section of a fiber optic cable 10" according to a further embodiment of the present invention wherein a seam guard 40' is disposed over ends of tape 34 which meet in an edge-to-edge, i.e. butt type, seam configuration. As best shown in FIG. 7, seam guard 40' comprises an substrate 42' formed of a polymeric material, for example, a MYLAR, a Nylon, or an acetyl resin, e.g. as sold under the tradename DELRIN, which polymeric materials preferably resist bonding to the jacket. A waterblocker comprising water swellable material 44 is embedded in and deposited on substrate 42' by depositing material 44 directly in and on inhibitor 42' after melt extrusion thereof, or by heating the surface thereof and then directly applying material 44 thereto. In either event, seam guard 40' is made by embedding superabsorbent material 44 directly in and on the material of substrate 42'. Embedding processes suitable for use with the present invention are described in commonly assigned patent U.S. Pat. No. 5,388,175, which is hereby incorporated by reference in its entirety. Seam guard 40' can be co-extruded with jacket 34 or paid off a reel onto tape 34 prior to extrusion. Alternatively, seam guard 40' may comprise substrate 42 formed of a layer of polymeric material, e.g. polypropylene, and a waterblocker 43 comprising a mixture of water swellable material 44 and UV curable resin. The mixture is applied to the polymeric layer and is cured by UV light. UV curable concepts are disclosed in commonly assigned patent U.S. Pat. No. 5,684,904, which is hereby incorporated by reference in its entirety.

FIG. 8 shows a section of fiber optic cable 10''' according to another embodiment of the present invention wherein a seam guard 40" is a strip of water-blocking tape comprising a preferably non-woven substrate and a water swellable material, e.g. a SAP. The embodiment of FIG. 8 obviates the need for a Mylar film type substrate. The substrate of seam guard 40", however, is preferably made in a robust manner so as to avoid breakage thereof during pay-off from a reel in a cable manufacturing operation. The substrate of seam guard 40" prevents adhesion of jacket 36 to tape 34 in the vicinity of the seam. Seam guard 40" is therefore operative to prevent cable zippering and to inhibit the ingress of moisture into the cable core.

The present invention has thus been described with reference to the foregoing embodiments, which embodiments are intended to be illustrative of the inventive concept rather than limiting. Persons of skill in the art will appreciate that variations and modifications of the foregoing embodiments may be made without departing from the scope of the appended claims. For example, seam guards 40, 40', 40" may be used with overlap, butt, or other tape seam configurations. Additionally, although seam guards 40, 40', 40" are shown as semi-circular shapes complimentary to that of tape 34, other shapes may be used as well, for example, wedge or inverted arcuate shapes. It is contemplated that an inverted arcuate shape would have a nose section which would fit the step of an overlap type seam. Furthermore, although the invention has been described with reference to a fiber optic cable with a plurality of buffer tubes, seam guards 40, 40' and 40" may be used with a monotube type fiber optic cable as well.

Accordingly, what is claimed is:

1. A fiber optic cable comprising:
    a cable core with at least one optical fiber;
    a layer of tape surrounding said cable core, said layer of tape comprising a seam;
    a seam guard placed adjacent said seam;
    a jacket surrounding said seam guard;
    said seam guard comprising a substrate operative to prevent cable zippering, and a waterblocker attached to said substrate, said waterblocker operative to inhibit the migration of moisture into said cable core, said seam guard being operative to perform dual functions of inhibiting both jacket zippering and the ingress of moisture into said cable core.

2. The fiber optic cable of claim 1, wherein said waterblocker comprises a non-woven substrate with a water swellable material therein.

3. The fiber optic cable of claim 1, wherein said waterblocker comprises a porous substrate with a water swellable material therein.

4. The fiber optic cable of claim 1, wherein said substrate comprises a layer of polymeric material of a film thickness.

5. The fiber optic cable of claim 1, wherein said substrate comprises a layer of polyimide film.

6. The fiber optic cable of claim 1, wherein said substrate comprises a layer of foamed plastic.

7. The fiber optic cable of claim 1, wherein said waterblocker comprises a water swellable material which is embedded in an outer surface of said substrate.

8. The fiber optic cable of claim 1, wherein said waterblocker comprises a mixture of water swellable material and a UV curable resin.

9. The fiber optic cable of claim 1, said substrate comprising a water-blocking tape and said waterblocker comprising a water swellable material.

10. The fiber optic cable of claim 1, wherein said cable core comprises a plurality of buffer tubes with respective optical fibers disposed therein.

11. The fiber optic cable of claim 1, wherein said cable core includes a monotube with said at least one optical fiber therein.

12. A fiber optic cable comprising:
    at least one optical fiber;
    a layer of tape surrounding said optical fiber, said layer of tape comprising a seam where edges of said tape are in close proximity;
    a seam guard covering said edges of said tape;
    a jacket surrounding said seam guard and said tape so that said jacket holds said seam guard in place adjacent said seam;
    said seam guard operative to perform dual functions, said seam guard comprising a substrate operative to prevent cable zippering, and a dry waterblocker attached to said substrate and operative to inhibit the migration of moisture in said cable.

13. The fiber optic cable of claim 12, wherein said substrate comprises a polymeric material operative to inhibit adhesion between said jacket and said layer of tape.

14. The fiber optic cable of claim 13, wherein said substrate has a film thickness.

15. The fiber optic cable of claim 12, wherein said dry waterblocker comprises a substrate and a superabsorbent material.

16. The fiber optic cable of claim 15, wherein said substrate comprises a porous material with said superabsorbent material therein.

17. The fiber optic cable of claim 12, wherein said seam is formed by overlapping edges of said tape.

18. The fiber optic cable of claim 17, wherein said seam is formed by a reverse overlap.

19. The fiber optic cable of claim 12, wherein a water-swellable material is embedded directly in said substrate.

20. A fiber optic cable comprising:

a cable core with at least one optical fiber;

a layer of tape surrounding said cable core, said layer of tape comprising a seam;

a seam guard placed adjacent said seam, said seam guard comprises a substrate operative to prevent cable zippering, and a water-blocking tape comprising a waterblocker, said water-blocking tape attached to said substrate, said waterblocker operative to inhibit the migration of moisture into said cable and;

a jacket surrounding said seam guard.

21. The fiber optic cable of claim 20, wherein said substrate comprises a polyester material.

22. The fiber optic cable of claim 20, wherein said substrate comprises a film thickness.

* * * * *